(No Model.)
J. F. KELLY.
ALTERNATING CURRENT MOTOR.
No. 515,962. Patented Mar. 6, 1894.
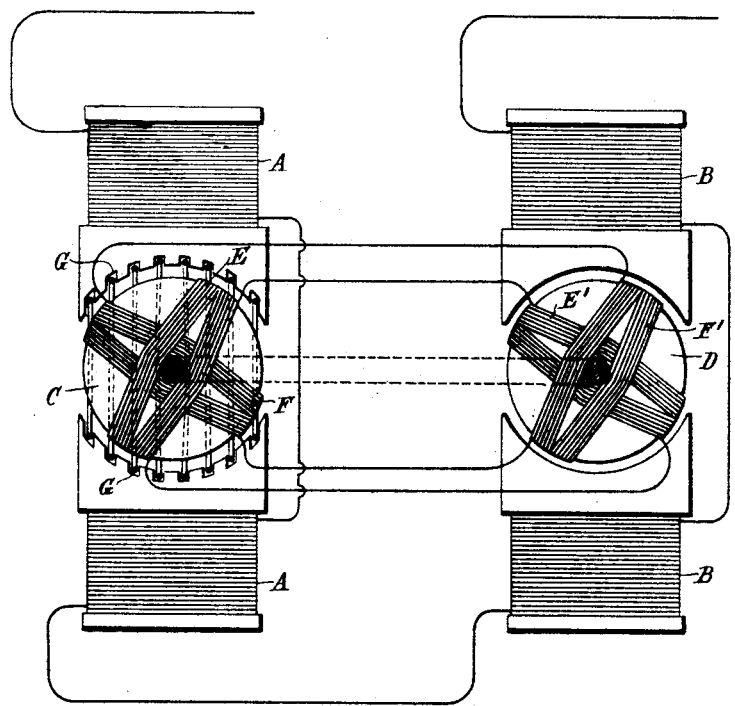
Witnesses
Raphaël Netter
James Catlow
By his Attorneys
Duncan & Page.
Inventor
John F. Kelly

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

ALTERNATING-CURRENT MOTOR.

SPECIFICATION forming part of Letters Patent No. 515,962, dated March 6, 1894.

Application filed March 27, 1893. Serial No. 467,707. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Alternating-Current Motors, of which the following is a specification, reference being had to the drawing accompanying and forming a part of the same.

This invention relates to a form of alternate current motor in which two independent sets of field magnets are employed in conjunction with two armatures mechanically and rigidly connected together as by being mounted on the same shaft, and which are wound with coils connected together in closed circuits. It is an essential condition of such motors that the poles of the two fields or the connected coils of the two armatures be angularly displaced with respect to one another, and it has been usual heretofore to operate such motors by passing into the field coils currents differing by a quarter phase. It is obvious that if both fields be excited from the same source of alternating currents, or in other words, if the phases of the exciting currents are in accord, no rotation will be produced, since the directions of rotation which the currents generated by induction from the two fields tend to impart to the connected armatures are opposite. If, however, the currents induced from one field are of greater value or made more important than the others without lessening the strength of the field in which they exert their effect, there will be a differential effect and the armatures will be started and maintained in rotation. This difference I obtain and make so great as to produce an efficient motor by effecting a choking or lagging of the currents produced by one field but not of the others, and this I accomplish, preferably, in the manner more fully explained hereinafter, by employing in one field stationary coils closed upon themselves and parallel with the armature coils which will act to neutralize the self-induction in the circuit of said armature coils, but omitting such compensating coils in the other field. Under these conditions the current produced by the field containing the compensating coils will be choked or caused to lag by the self-induction in the circuit, while the currents generated by the other field will flow freely, the self-induction in that circuit being neutralized by the compensating coils.

The manner in which the invention is carried into effect is illustrated in the accompanying drawing, which represents diagrammatically and by vertical sections the apparatus.

A A designate one set of the field magnets, and B B the other. Between the poles of the respective fields are armature cores C, D, wound with coils E, F, E', F', the coil E being connected with and closed through the coil E', which is displaced with reference to it, at an angle of ninety degrees, and the intermediate coils F and F' being similarly connected. Both armatures, as indicated, are mounted on a common shaft, and the poles of the two fields are in alignment.

In one of the fields, as A A, and preferably in grooves in the face of the poles, are closed stationary coils G, the convolutions of which are parallel to the coils on the armature. The purpose and function of such coils are now well understood, their action in the present case being to cause the currents in the coils on armature C, produced by induction from the field B, to flow freely, while in field B where these coils are not used the currents induced from field A are choked and retarded.

The coils of the field magnets A and B are connected either in series or multiple with a source of alternating currents.

Having now described my invention, what I claim is—

1. In an alternate current motor having independent fields and rigidly connected armatures substantially as described, the combination with one of said fields and the armature coils therein of means for neutralizing the choking or lagging of the currents in said coils produced by induction from the opposite field.

2. In an alternate current motor having independent fields and rigidly connected armatures substantially as described, the combination of closed stationary coils with one of said fields the convolutions of which are parallel with those on the armature in said field, as set forth.

3. The method herein described of operating motors having independent fields and rigidly connected armatures, which consists in energizing the fields simultaneously by alternating currents of the same phase, and energizing the armatures by alternating currents of different value.

JOHN F. KELLY.

Witnesses:
JOHN H. KELMAN,
ERNEST B. CASTLE.